US007106191B1

(12) United States Patent
Liberati

(10) Patent No.: US 7,106,191 B1
(45) Date of Patent: Sep. 12, 2006

(54) CHILD DISTANCE MONITORING AND ALERTING SYSTEM

(76) Inventor: Beatriz Liberati, 460 Jeter St., Redwood City, CA (US) 94062

( * ) Notice: Subject to any disclaimer, the term of this patent is extended or adjusted under 35 U.S.C. 154(b) by 0 days.

(21) Appl. No.: 11/052,691

(22) Filed: Feb. 18, 1999

Related U.S. Application Data

(63) Continuation-in-part of application No. 09/073,206, filed on May 4, 1998, now abandoned.

(51) Int. Cl.
*G08B 1/08* (2006.01)
*H04Q 7/00* (2006.01)

(52) U.S. Cl. .......................... 340/539.15; 340/539.21; 340/539.23; 340/573.1

(58) Field of Classification Search ........... 340/539.15, 340/539.21, 539.23
See application file for complete search history.

(56) References Cited

U.S. PATENT DOCUMENTS 4,785,291 A * 11/1988 Hawthorne .............. 340/573.4
4,899,135 A * 2/1990 Ghahariiran ............. 340/573.4
5,289,163 A * 2/1994 Perez et al. ............ 340/539.32
5,530,426 A * 6/1996 Wilk .......................... 340/531
5,900,817 A * 5/1999 Olmassakian ............ 340/573.1

* cited by examiner

*Primary Examiner*—Jeffery Hofsass
*Assistant Examiner*—Samuel J. Walk
(74) *Attorney, Agent, or Firm*—Goldstein Law Office P.C.

(57) ABSTRACT

A child distance and alerting system comprising a transmitter unit to be attached to a child's clothing and a receiver unit to be carried by a parent or guardian supervising the child, for preventing the child from wandering too far and becoming vulnerable to predators. The transmitter unit includes a disc-shaped body, a pin portion extending outwardly therefrom for piercing an article of clothing, and a pin-receiving component adapted for releasably clamping the pin portion so that the transmitter unit can be attached to the child's clothing. Once the pin portion and the pin-receiving component are properly joined, the transmitter unit cannot be removed from the child's clothing except by use of a special tool. The transmitter unit is designed to transmit radio frequency signals when it is attached to the child's clothing and remains activated until the pin-receiving component is removed from the pin portion. The receiver unit receives the radio frequency signals sent by the transmitter unit and produces either an audible warning sound or a silent vibrating warning whenever the transmitter unit has traveled outside the predetermined distance from the receiver unit. The receiver unit will also alert the user when an unauthorized attempt has been made to remove the transmitter unit from the child.

3 Claims, 2 Drawing Sheets

CHILD DISTANCE MONITORING AND ALERTING SYSTEM

CROSS REFERENCE TO RELATED APPLICATION

This application is a continuation-in-part application of U.S. patent application Ser. No. 09/073,206 filed May 4, 1998, which is now abandoned.

BACKGROUND OF THE INVENTION

This invention relates to a child distance monitoring and alerting system. More particularly, the invention relates to a device which employs a transmitter unit to be worn by a child, and a receiver unit to be worn by a parent, for alerting the parent when the child has wandered out of range. Further, the invention relates to the transmitter unit having a temper-resistant fastening means incorporated therein for preventing unauthorized removal of the transmitter unit from the child's clothing.

Various references uncovered in the prior art provide devices that utilize a transmitter and receiver arrangement for monitoring or locating a child. For example, U.S. Pat. No. 5,389,915 to Chen discloses a child separation alarm comprising a first safety pin to be worn by a person for transmitting a wireless signal which is to be received by another person wearing a second safety pin for receiving the wireless signal and initiating a buzzer when no wireless signal is received thereby. Likewise, U.S. Pat. No. 5,617,074 to White discloses a child finder constructed as a watch or jewelry to be worn by a child in which a transmitter is mounted for sending a monitoring signal to a conventional receiver so that the child's location can be continually monitored.

Most of these prior art devices may not provide adequate protection against perpetrators, including kidnappers, since these devices, when worn by a child, can be easily removed therefrom by a perpetrator before the child is forcibly taken away. Therefore, there is still a further need to provide an improved child distance monitoring and alerting system for alerting a guardian that the supervised child has wandered off too far. Such a child distance monitoring and alerting system should incorporate a tamper-resistant fastening feature within the transmitter unit so that it can be securely attached to an article of clothing worn by a child, thereby making removal of the transmitter unit therefrom difficult to accomplish without having a special tool to detach it. Moreover, such a child distance monitoring and alerting system should initiate an alarm or a vibrator within the receiver unit worn by a parent whenever a child with the transmitter unit wanders beyond a predetermined distance or whenever the transmitter unit becomes detached from the child's clothing.

While these units mentioned above may be suitable for the particular purpose employed, or for general use, they would not be as suitable for the purposes of the present invention as disclosed hereafter.

SUMMARY OF THE INVENTION

It is an object of the invention to provide a child distance monitoring and alerting system, which alerts an individual supervising a child that the child has wandered out of range from the supervising individual.

It is another object of the invention to provide a child distance monitoring and alerting system which utilizes a tamper-resistant fastening means to securely attached the transmitter unit to an article of clothing worn by a child so as to prevent unauthorized removal thereof.

It is yet another object of the invention to provide a child distance monitoring and alerting system, which initiates an audible alarm or a vibration generator within the receiver unit whenever the child wearing the transmitter unit wanders out of range.

It is a further object of the invention to provide a child distance monitoring and alerting system, which triggers an audible alarm or a vibrator within the receiver unit in the event of an unauthorized removal of the transmitter unit from the child's clothing.

It is still further object of the invention to provide a child distance monitoring and alerting system, which comprises a transmitter unit having a tamper-resistant fastening means incorporated, therein so that the child wearing it cannot remove it.

The invention is a child distance monitoring and alerting system comprising a transmitter unit to be attached to a child's clothing and a receiver unit to be carried by a parent or guardian supervising the child, for preventing the child from wandering too far and becoming vulnerable to predators. The transmitter unit includes a disc-shaped body, a pin portion extending outwardly therefrom for piercing an article of clothing, and a pin-receiving component adapted for releasably clamping the pin portion so that the transmitter unit can be attached to the child's clothing. Once the pin portion and the pin-receiving component are properly joined, the transmitter unit cannot be removed from the child's clothing except by use of a special tool. The transmitter unit is designed to transmit radio frequency signals when it is attached to the child's clothing and remains activated until the pin-receiving component is removed from the pin portion. The receiver unit receives the radio frequency signals sent by the transmitter unit and produces either an audible warning sound or a silent vibrating warning whenever the transmitter unit has traveled outside the predetermined distance from the receiver unit. The receiver unit will also alert the user when an unauthorized attempt has been made to remove the transmitter unit from the child.

To the accomplishment of the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
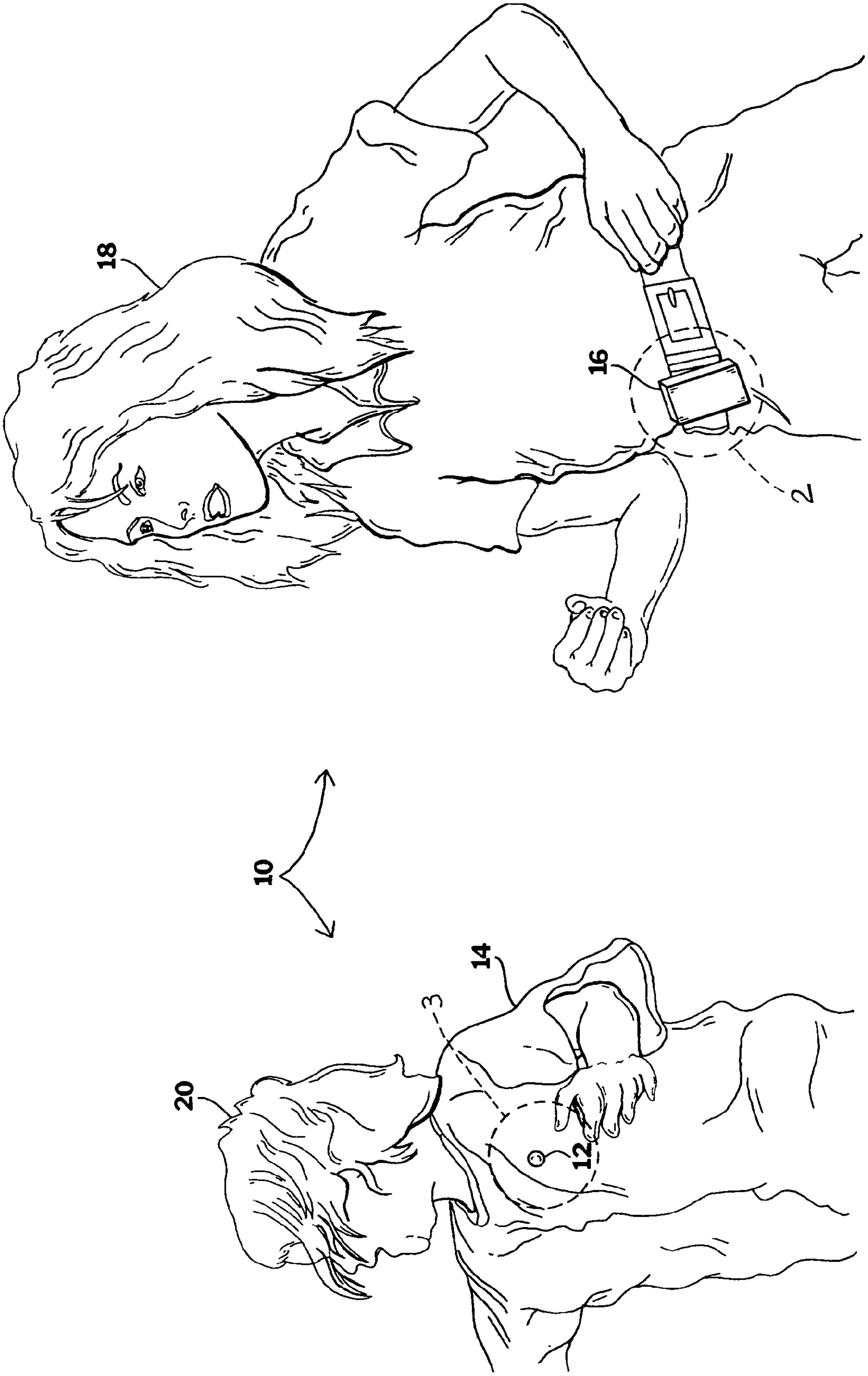
FIG. 1 is a diagrammatic perspective view of a child distance monitoring and alerting system being used by a parent and a child in accordance with the principles of the present invention.

FIG. 1 illustrates a preferred embodiment of a child distance monitoring and alerting system 10 comprising a transmitter unit 12 to be attached a child's clothing 14 and a receiver unit 16 to be carried by a parent or guardian 18 supervising the child 20. As will be seen in following paragraphs, the child distance monitoring and alerting system 10 is designed to prevent the supervised child 20 from wandering too far and becoming vulnerable by alerting the parent 18 when the child 20 has wandered beyond a predetermined distance.

Figure 3:
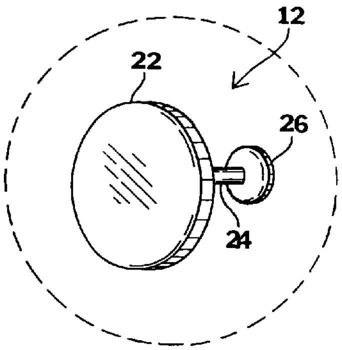
FIG. 3 is a diagrammatic perspective view of a transmitter unit shown in circle 3 in FIG. 1.
Figure 4:
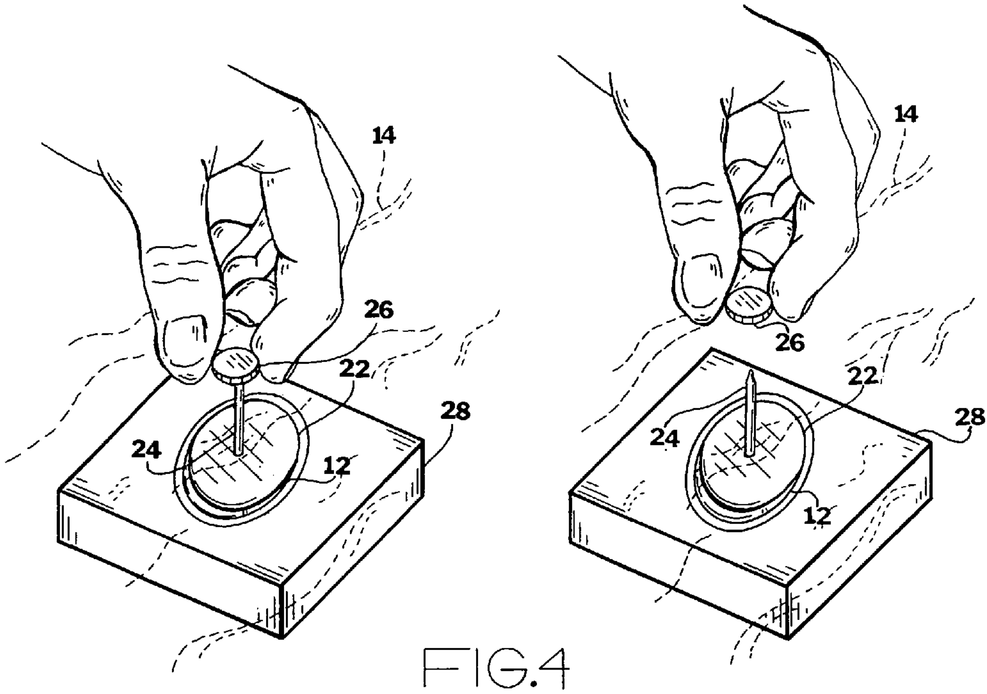
FIG. 4 is a diagrammatic perspective view of the transmitter unit attached to a piece of fabric, illustrating a special tool being used to detach the pin-receiving component from the pin portion of the transmitter unit.

FIG. 3 illustrates the transmitter unit 12 to be attached to the child's clothing 14 for transmitting radio frequency signals to the receiver unit 16 carried by the parent 18. FIGS. 1 and 4 illustrates the transmitter unit 16 including a disc-shaped body 22 having a transmitter mounted therein for transmitting radio frequency signals, a pin portion 24 extending outwardly therefrom for piercing an article of clothing, and a pin-receiving component 26 having a bore for receiving the pin portion 24. The disc-shaped body 22 is preferably small in size and thus can be easily concealed from other individuals. The transmitter is electrically connected to a portable power source, the pin portion 24, and the pin-receiving component 26 such that the transmitter is activated when the pin-receiving component 26 is engaged with the pin portion 24 and remains activated until the pin-receiving component 26 is removed therefrom.

One important feature of the present invention is a tamper-resistant fastening means incorporated within the transmitter unit 12 to permit attachment to an article of clothing while prohibiting unauthorized removable of the transmitter unit 12 therefrom. The pin-receiving component 26 is adapted for releasably clamping the pin portion 24 so that the transmitter unit 12 can be secured to an article of clothing. However, once joined, the transmitter unit 12 is constructed to prohibit subsequent release of the pin-receiving component 26 from the pin portion 24 except by use of a special tool 28. FIG. 4 illustrates the special tool 28 being used to permit authorized release of the transmitter unit 12 from the child clothing 14. The special tool 28 includes an actuating means adapted to actuate the tamper-resistant fastening means of the transmitter unit 12 so that the pin-receiving component 26 can be disengaged from the pin portion 24.

The tamper-resistant fastening means of the transmitter unit 12 and the actuating means of the special tool 28 can take the form of magnetic release mechanisms, for activating an alarm if they are not properly removed. In this form, the pin-receiving component 26 may include magnetic parts that can be actuated only by using the special tool 28 having an electromagnetic means which when energized actuates the magnetic parts of the pin-receiving component 26 to facilitate release thereof from the pin portion 24 of the transmitter unit 12. Alternatively, the tamper-resistant fastening means can take the form of spring mechanism incorporated within the pin-receiving component 26 to frictionally entrap the pin portion 24, wherein the spring mechanism is not accessible except by use of a special tool for displacing the spring mechanism so that the pin-receiving component 26 can be disengaged from the pin portion 24.

Figure 2:
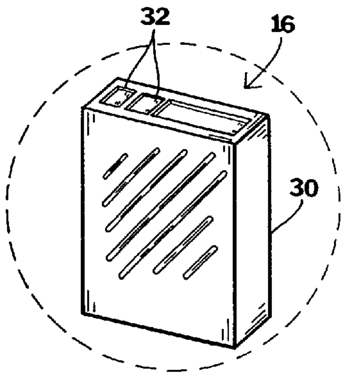
FIG. 2 is a diagrammatic perspective view of a receiver unit shown in circle 2 in FIG. 1.

FIGS. 1 and 2 illustrate the receiver unit 16 which includes a receiver for receiving the radio frequency signals sent by the transmitter unit 12, a casing 30 for holding electronic components, and a clamping means attached to the casing 30 for clamping the receiver unit 16 on the wearer. The receiver unit 16 further includes an audible alarm which is electrically connected to the receiver, and a portable power source such that whenever the signal detected by the receiver falls below a predetermined threshold level, the alarm is activated to audibly alert the wearer that the transmitter unit 12 has traveled outside the prescribed range from the receiver unit 16. The alarm within the receiver unit 16 will also be activated to indicate that an unauthorized attempt may have been made to remove the transmitter unit 12 from the child's clothing 14, since the transmitter unit 12 automatically stops sending signals when the pin-receiving component 26 is detached from the pin portion 24.

In a preferred embodiment, the receiver unit 16 includes a vibration generator to provide a vibrating action for silently alerting that the supervised child 20 may be outside of the prescribed range. In this embodiment, switches 32 is provided on the receiver unit 16 for allowing the user to choose between an audible alert mode wherein the alarm will produce an alarming sound, and a vibration alert mode wherein the vibration generator will vibrate, in response to the signal detected by the receiver falling below a predetermined threshold level.

The operation of the child distance monitoring and alerting system 10 will now be described. To ensure that a child does not wander off too far, the transmitter unit 12 is attached to an article of clothing worn by the child, preferably in a concealed location so that it cannot be easily detected by others. A parent supervising the child carries the receiver unit 16, which will alert the parent when the strength of the signals transmitted by the child's transmitter unit 12 falls below a predetermined threshold level, wherein the strength of the signal represents the distance between the parent and the child. In this manner, the parent can be alerted as soon as the child has strayed outside a predefined radius from the parent, thereby enabling the parent to find the child before the child has an opportunity to wander off too far, and get lost, or become vulnerable to kidnappers and accidents.

Many specific details contained in the above description merely illustrate some preferred embodiments and should not be construed as a limitation on the scope of the invention. Many other variations are possible.

What is claimed is:

1. A child distance monitoring and alerting device for alerting a user when a child under the supervision of the user has strayed beyond a predetermined distance, said child distance monitoring and alerting device comprising:

a) a transmitter unit having a transmitter for transmitting radio frequency signals, a first portable power source, and a circuit means, said circuit means electrically connected to said transmitter, and said first portable power source such that when said transmitter unit is attached to a child's clothing, the transmitter transmits radio frequency signals and remains activated until said transmitter unit is removed from said child's clothing; and b) a receiver unit having a receiver for receiving said radio frequency signals sent by said transmitter unit, and an audible alarm electrically connected to said receiver, and a second portable power source such that whenever said signals detected by the receiver falls below a predetermined threshold level the alarm is activated to audibly alert the user that either the child wearing said transmitter unit has wandered outside said predetermined distance from said user or an unauthorized attempt may have been made to remove said transmitter unit from the child, the receiver unit further comprises a vibration generator electrically connected to the portable power supply, and the receiver such that whenever the signal detected by the receiver falls below the predetermined threshold level, the vibration generator vibrates to silently alert the user that the supervised child may be outside of the predetermined range, switch means for allowing the user to select between an audible alert mode wherein the alarm will produce an alarming sound, and a vibration alert mode wherein said vibration generator will vibrate, in response to the child straying beyond the predetermined distance;

c) a tamper-resistant fastening means incorporated within the transmitter unit to permit attachment to an article of clothing while prohibiting unauthorized removal of the transmitter from said clothing, the transmitter unit further comprises a body for housing electronic components, a pin portion extending outwardly from the body for piercing an article of clothing, a pin-receiving component having a bore adapted for releasably clamping said pin portion so that the transmitter unit can be secured to said clothing, wherein said pin-receiving component is so constructed to prohibit subsequent release of said pin-receiving portion except by use of a special tool, wherein said pin-receiving component including magnetic parts that can be actuated only by using said special tool, said special tool having an electromagnetic means which when energized actuates said magnetic parts of the pin-receiving component to facilitate release thereof from the pin portion of the transmitter unit.

2. A child distance monitoring and alerting device for alerting a user when a child under the supervision of the user has strayed beyond a predetermined distance, said child distance monitoring and alerting device comprising:

a) a transmitter unit having a body for housing electronic components, a transmitter for transmitting radio frequency signals, a first portable power source, and a circuit means, said circuit means electrically connected to said transmitter, and said first portable power source such that when said transmitter unit is attached to a child's clothing, the transmitter transmits radio frequency signals and remains activated until said transmitter unit is removed from said child's clothing, the transmitter unit further having a tamper resistant fastening means to permit attachment to an article of clothing while prohibiting unauthorized removal of the transmitter from said clothing having a pin portion extending outwardly from the body for piercing an article of clothing, and a pin-receiving component having a bore adapted for releasably clamping said pin portion so that the transmitter unit can be secured to said clothing, wherein said pin-receiving component is so constructed to prohibit subsequent release of said pin-receiving component from said pin portion except by use of a special tool; and b) a receiver unit having a receiver for receiving said radio frequency signals sent by said transmitter unit, and an audible alarm electrically connected to said receiver, and a second portable power source such that whenever said signals detected by the receiver falls below a predetermined threshold level, the alarm is activated to audibly alert the user that either the child wearing said transmitter unit has wandered outside said predetermined distance from said user or an unauthorized attempt may have been made to remove said transmitter unit from the child.

3. The child distance monitoring device as recited in claim 2, wherein the receiver unit further comprises:

a) a vibration generator electrically connected to the portable power supply, and the receiver such that whenever the signal detected by the receiver falls below a predetermined threshold lever, the vibration generator vibrates to silently alert the user that the supervised child may be outside of the predetermined range; and b) switch means for allowing the user to select between an audible alert mode wherein the alarm will produce an alarming sound, and a vibration alert mode wherein said vibration generator will vibrate, in response to the child straying beyond the predetermined distance.

* * * * *